United States Patent [19]

Nahm et al.

[11] Patent Number: 5,309,997
[45] Date of Patent: May 10, 1994

[54] WELL FLUID FOR IN-SITU BOREHOLE REPAIR

[75] Inventors: James J. W. Nahm; Reece E. Wyant, both of Houston, Tex.

[73] Assignee: Shell Oil Company, Houston, Tex.

[21] Appl. No.: 964,982

[22] Filed: Oct. 22, 1992

[51] Int. Cl.$^5$ .................. E21B 33/138; E21B 33/14
[52] U.S. Cl. .................. 166/292; 166/300; 175/64; 175/65; 507/140
[58] Field of Search .................. 175/64, 65, 72; 166/291, 292, 300; 106/784, 790; 507/140

[56] References Cited

U.S. PATENT DOCUMENTS

| | | |
|---|---|---|
| 2,122,236 | 6/1938 | Nichols et al. .................. 507/140 |
| 2,336,723 | 12/1943 | Drummond . |
| 2,649,160 | 8/1953 | Williams et al. . |
| 2,776,112 | 1/1957 | Ilfrey et al. .................. 175/64 |
| 2,822,873 | 2/1958 | Harmsen et al. . |
| 2,880,096 | 3/1959 | Hurley . |
| 2,895,301 | 7/1959 | Casagrande et al. . |
| 2,899,329 | 8/1959 | Lyons . |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 3,964,921 | 6/1976 | Persinski et al. . |
| 4,014,174 | 3/1977 | Mondshine . |

(List continued on next page.)

FOREIGN PATENT DOCUMENTS 8514406924 7/1983 Japan .
61-48454 3/1986 Japan .
883704 6/1981 U.S.S.R. .

OTHER PUBLICATIONS

"Deep Cement Mixing Experience in Japan", by G. Dennis et al, Copyright 1985 Seabed Strengthening Symposium, Denver, Colo., Jun. 4, 1985, TP 85-5.
"Mud Disposal: An Industry Perspective", Hanson et al, Drilling, May 1986, pp. 16-21.
"Waste Minimization Program Can Reduce Drilling Costs", Hall et al, Oryx Energy Co., Houston, Tex., Oil & Gas Journal, Jul. 1, 1991, pp. 43-46.
"Phosphoric Acids and Phosphates", Kirk-Othmer, Enc. of Chemical Technology, 3rd Ed., vol. 17, p. 477.
"Conversion of Drilling Fluids to Cements with Blast Furnace Slag-Performance Properties and Applications for Well Cementing", SPE Paper 24575 (Oct. 4, 1992) by Cowan et al.
"Quantitative Interpretation of X-Ray Diffraction Patterns of Mixtures. I. Matrix-Flushing Method for Quantitative Multicomponent Analysis" by Frank H. Chung, J. Appl. Cryst. (1974) 7, pp. 519-525.

Primary Examiner—George A. Suchfield

[57] ABSTRACT

A method for consolidating incompetent formations penetrated by a borehole using drilling fluids. The method uses a water-based drilling fluid the solids contents of which includes microfine-ground blast furnace slag. This provides a fluid that will penetrate the incompetent formation and harden in place to consolidate the formation. Subsequent cementing with a cementitious slurry comprising water, activator and normally-ground blast furnace slag results in a compatible cement which will adhere to filter cake from the drilling.

18 Claims, No Drawings

U.S. PATENT DOCUMENTS

| | | |
|---|---|---|
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,335,980 | 6/1982 | DePriester . |
| 4,338,134 | 7/1982 | Graf zu Munster . |
| 4,425,055 | 1/1984 | Tiedemann . |
| 4,427,320 | 1/1984 | Bhula . |
| 4,450,009 | 5/1984 | Childs et al. . |
| 4,460,292 | 7/1984 | Durham et al. . |
| 4,518,508 | 5/1985 | Conner . |
| 4,643,617 | 2/1987 | Kanno et al. ............ 405/222 |
| 4,664,843 | 5/1987 | Burba, III et al. . |
| 4,666,128 | 5/1987 | Hartley et al. . |
| 4,674,574 | 6/1987 | Savoly et al. ............ 166/293 |
| 4,690,589 | 9/1987 | Owa ......................... 405/263 |
| 4,692,065 | 9/1987 | Suzuki et al. ............ 405/211 |
| 4,720,214 | 1/1988 | Brasted et al. . |
| 4,746,245 | 5/1988 | Mork ........................ 405/224 |
| 4,760,882 | 8/1988 | Novak . |
| 4,761,183 | 8/1988 | Clarke . |
| 4,790,954 | 12/1988 | Burba, III et al. . |
| 4,880,468 | 11/1989 | Bowlin et al. . |
| 4,897,119 | 1/1990 | Clarke . |
| 4,913,585 | 4/1990 | Thompson et al. . |
| 4,942,929 | 7/1990 | Malachosky et al. . |
| 4,991,668 | 2/1991 | Rehm et al. . |
| 5,016,711 | 5/1991 | Cowan . |
| 5,020,598 | 6/1991 | Cowan et al. ............ 166/293 |
| 5,026,215 | 6/1991 | Clarke . |
| 5,058,679 | 10/1991 | Hale et al. . |
| 5,082,499 | 1/1992 | Shen ........................ 106/735 |
| 5,086,850 | 2/1992 | Harris et al. . |
| 5,105,885 | 4/1992 | Bray et al. . |
| 5,106,423 | 4/1992 | Clarke . |
| 5,121,795 | 6/1992 | Ewert et al. . |
| 5,123,487 | 6/1992 | Harris et al. . |
| 5,125,455 | 6/1992 | Harris et al. . |
| 5,127,473 | 7/1992 | Harris et al. . |
| 5,133,806 | 7/1992 | Sakamoto et al. ........ 106/811 |
| 5,147,565 | 9/1992 | Bour et al. ............... 252/8.551 |

५,३०९,९९७

WELL FLUID FOR IN-SITU BOREHOLE REPAIR

BACKGROUND OF THE INVENTION

The present invention relates to boreholes and particularly to boreholes that are drilled in the search for petroleum deposits.

In drilling boreholes in the search for petroleum deposits, particularly in the Gulf Coast area, both onshore and offshore, the borehole often penetrates shallow water-bearing sand formations. These water-bearing sand formations range in depth from 1000 to a few thousand feet below the surface or, in the case of an offshore well, below the mudline. When the surface casing is subsequently installed in the well and cemented in place, the water in these sands may flow from behind the surface casing washing out the sand grains and/or cement, producing voids. The washed out cement and voids reduce the structural integrity of the casing installation and the cementing of the casing in the formation is seriously impaired. The reduction in the structural integrity results in the inability of the casing to contain the water flow and to support the wellhead equipment that is installed on the top of the casing and is required for drilling of the borehole. This is a particular problem in offshore wells where the surface casing must not only support the wellhead equipment but also a portion of the weight of the conductor pipe that is suspended from the drill rig.

In the past various attempts have been made to isolate these shallow water sand formations to prevent their subsequently damaging the structural integrity of the surface casing and its cementing to the borehole. These attempts have usually comprised the use of drilling muds in an attempt to deposit a filter cake over the sand formation to partially consolidate the formation adjacent the borehole, shut off the water flow, and hold the soft formation in place by hydrostatic pressure until the casing is cemented in the drilled hole. These attempts have had only moderate success because the filter cake itself never hardens and the Portland cement normally used is not compatible with, and will not bond to, the mud cake. Small channels are left through which the produced water will flow, washing out the mud cake and the soft formation, destroying the support for the casing system.

An additional problem arises very frequently in the offshore well cases where seawater, rather than mud, is used to circulate the drill bit cuttings from the borehole while drilling the well, prior to setting the surface casing. The seawater is not sufficiently dense to hydraulically support the soft formation borehole walls, a competent filter cake is not deposited to help consolidate the formation, and water flows from exposed water. bearing zones causing the incompetent formation to crumble and slough even more. A poor cement job is then obtained and subsequent water flow further undermines the casing.

Attempts have been made to improve the cement bond by using mechanical means for removing the mudcake from the borehole wall and displacing sea water from the annulus between the casing and the borehole prior to cementing. These attempts have not been successful because removal of the mudcake allows the water to flow from the sand and destroy the structural integrity of the bond between the cement and the borehole wall. Furthermore, mechanical methods of filter cake removal lead to damage to the exposed borehole face, leading to further crumbling.

Grouting with fine ground slag cement is known. Such as disclosed in Clarke, U.S. Pat. No. 4,761,183 (Aug. 2, 1988) and Clarke, U.S. Pat. No. 5,106,423 (Apr. 21, 1992). The '423 patent also discloses petroleum as an area of utility for the cementitious slurries described in the invention.

SUMMARY OF THE INVENTION

It is an object of this invention to stabilize water-bearing sand formations through which wellbores are drilled.

It is a further object of this invention to avoid washing out of the cement around a wellbore casing.

It is yet a further object of this invention to cement a casing for a wellbore in a salt water environment.

In accordance with this invention a borehole is drilled using a drilling fluid containing microfine-ground blast furnace slag under sufficient pressure to cause flow of the drilling fluid into the formation; the drilling fluid either contains an activator or an activator is later circulated into contact with the microfine-ground blast furnace slag which flowed into the formation.

In accordance with another embodiment of this invention a borehole is drilled using a drilling fluid comprising water and microfine ground blast furnace slag under sufficient pressure to cause flow of the drilling fluid into the formation; thereafter a casing is inserted into the borehole and a cementitious slurry comprising water or the original drilling fluid and normally ground blast furnace slag is introduced into the annulus between the casing and the borehole wall.

DETAILED DESCRIPTION OF THE INVENTION

The present invention solves the above problems by drilling the surface portion of the borehole using a drilling fluid that will provide a self-setting filter cake to improve the isolation of the water-containing sand formations. In addition, the filter cake is compatible with a cementitious material made with normally ground blast furnace slag that is used for cementing the casing in the borehole. The combination of the filter cake and a cementitious material that is compatible with the filter cake provides a structurally strong bond between the cement and the formation and minimizes the possibility of the water flowing from the sand formation and destroying the bond between the cement and the formation.

In addition to the above, the small particle size material in the drilling fluid also tends to penetrate the sand formation containing the water and thus further strengthens the formation to support the casing once a casing is cemented in place. Collapse of the casing will be prevented as a result of compaction of the unconsolidated sand formation penetrated by the borehole.

The invention is useful in consolidating incompetent formations penetrated by a borehole regardless of their depth. The drilling can be carried out with a composition comprising water, clay and microfine-ground blast furnace slag which becomes a self-setting mudcake on the borehole wall that penetrates the formation to consolidate it. Alternatively, the drilling fluid can be just seawater and the microfine-ground blast furnace slag. The material can be tailored by controlling the size of material so that sufficient fine material is available to readily penetrate the unconsolidated formation. Thus, when the material hardens it will consolidate the formation.

In a similar manner the invention can also be used for improving the axial support of casings that are used for casing a borehole. When used in this manner, the drilling is done using microfine-ground blast furnace slag to deposit a filter cake, which is compatible with the cement that is subsequently used for cementing the casing in place. In addition, the blast furnace slag which is deposited as mudcake is tailored as described above so that it will penetrate the pores of formations as they are drilled. Thus, it will strengthen the incompetent formations and prevent their collapse or disintegration. By preventing the collapse of the formations, the axial support for the casing will be maintained on subsequent cementing with a cementitious slurry containing normally-ground blast furnace slag.

DEFINITIONS

As used herein the term 'microfine' is used to designate a blast furnace slag ground more finely than the normally ground slag. Stated in Blaine surface area, it means a composition with particles of sufficiently small size as to exhibit a Blaine specific surface area of greater than 8,000 cm$^2$/g. Generally, such compositions will exhibit a Blaine specific surface area between 8,000 and 20,000 cm$^2$/g, more generally, 10,000 to 12,000 cm$^2$/g Stated in particle size, the microfine-ground material will generally have less than 1 wt % of the particles with a size greater than 16 microns in diameter and at least 1 wt % less than 1 micron in diameter, with greater than 50 wt % of the particles being between 2 and 6 microns in diameter.

By 'normally ground' as used herein is meant those slag compositions having a particle size such as to exhibit a Blaine specific surface area of less than 8,000 cm$^2$/g, generally 2,000 to 7,000 cm$^2$/g. Such compositions are generally made up of particles between 1 and 60 microns with greater than 50 wt % being between 4 and 20 microns.

DRILLING FLUIDS

The term 'drilling fluid' as used herein means water-based fluids which contain water, microfine-ground blast furnace slag, and at least one other additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

The drilling fluid is a water-based drilling fluid which encompasses both fresh water muds, salt water muds, whether made from seawater or brine, and other muds having water as the continuous phase including oil-in-water emulsions. It is generally preferred that the drilling fluids use water containing dissolved salts, particularly sodium chloride. In these instances, 0.1 to 26, preferably 3 to 10 wt % sodium chloride may be used. In some instances a saturated solution under the conditions used might be employed. Various salts, preferably inorganic salts, are also suitable for use in the drilling fluid in addition to, or instead of, NaCl, including, but not limited to, NaBr, KCl, CaCl$_2$, NaNO$_3$, NaC$_2$H$_3$O$_2$, KC$_2$H$_3$O$_2$, NaCHO$_2$ and KCHO$_2$.

The initial drilling fluid generally contains the microfine ground blast furnace slag in an amount within the range of 1 to 100 lbs/bbl of final drilling fluid, preferably 10 to 80 lbs/bbl, most preferably 20 to 50 lbs/bbl. The microfine ground blast furnace slag may be the only slag component in the drilling fluid or the drilling fluid can be comprised of a mixture of normally ground slag and microfine ground slag, or a product of a single grinding process which inherently gives microfine ground material and material corresponding to normally ground material.

The drilling fluid may contain no activator since the fine particles of blast furnace slag which migrate into the formation will eventually harden due to the action of the water and salts present in the formation. It may, however, have a small amount of activator so as to speed up the hardening. This can be accomplished without the drilling fluid setting up in the wellbore because the moving drilling fluid tends to harden more slowly. When used in the initial drilling fluid, the amount used will vary depending on the type of accelerator used. In the case of caustic soda and soda ash from 0.1 to 10 lbs/bbl of caustic soda, more preferably 0.1 to 2 lbs/bbl can be used in conjunction with 0.1 to 15 lbs/bbl, preferably 0.1 to 3 lbs/bbl of soda ash. The reference to 'lbs/bbl' of activator in the drilling fluid means pounds per barrel of total drilling fluid.

In the case of offshore wells, and particularly when drilling the surface portion of the borehole, drilling fluids based on sea water as the liquid phase are highly desirable. Thus, the drilling fluid will be compatible with the sea water present in the environment surrounding the borehole. Also, an unlimited supply of seawater is readily available.

A more complete description of base drilling fluids that can be used in the present invention is contained in U.S. Pat. No. 5,058,679 issued on Oct. 22, 1991 and entitled "Solidification of Water-Based Muds". This patent is incorporated by reference in the present specification.

When mixtures of microfine ground and normally ground blast furnace slag are used, the microfine particles can penetrate the formation before the filter cake is formed on the formation's face by the larger particles of slag which can block the microfine particles' entry. Thus, when these self-setting hydraulic materials harden, the weak formation is more firmly and more deeply strengthened.

Even before the hydraulic materials set, the increased penetration of the microfine particles into the formation will increase the mechanical strengthening of the borehole obtained by the filter cake and help seal off formation fluids, allowing continued drilling of the borehole with reduced danger of the incompetent formations collapsing. The hydraulic particles are carried to the formation in the fluid used to drill the well. Thus, the particles are present immediately as the formation is drilled and can deeply invade newly exposed formation before the surface can be plugged by other solids which may be present.

To prevent fluid flow from water-bearing formations penetrated and to reduce the collapse of incompetent formations, the drilling fluid should have a sufficient density to give a hydrostatic pressure greater than that of the formation fluid. The pressure differential causes the drilling fluid to flow into the formation, carrying the microfine blast furnace slag into the formation pores and building the filter cake. The drilling fluid density is increased by the addition of the blast furnace slag. If necessary, the density can be further increased by adding a soluble salt such as NaCl, CaCl$_2$, NaBr, ZnBr$_2$ or standard insoluble weighting materials such as ground barite. The addition of ground barite or other solids will, unfortunately, accelerate the filter cake buildup and reduce the penetration of the blast furnace slag particles. Therefore, weight adjustment through the use of soluble salts is preferred.

The pressure differential also is increased by the circulation pressure (supplied by the mud pump) required to circulate the drilling fluid. This additional pressure will increase the flow rate of the microfine material into the formation but it also can increase the total pressure on the formation sufficiently to cause fracturing of a formation penetrated by the borehole. The fluid properties must be controlled so that the formation pressures are contained while the drilling fluid is static and the formations are not hydraulically fractured when the drilling fluid is circulated. In addition, as described in the '679 patent, the rheological properties of the drilling fluid can be controlled or modified by using any of many well known chemical I5 dispersants for water-based drilling fluids. The more common materials are the lignosulfonates commonly added to drilling fluid to control its rheological properties. Several lignosulfonates also serve to retard the setting time of the fluids.

By consolidating the incompetent formations, the tendency of the formation to collapse or disintegrate is greatly reduced. Further, by filling the pores any water flow is greatly reduced and the damage to the bond between the formation and the cement used for cementing the surface casing in place is also reduced.

CEMENTING

After the wellbore is drilled and a casing inserted, a compatible cementitious slurry is used to cement the casing. This cementitious slurry contains normally ground blast furnace slag in an amount sufficient to give 20 to 600 lbs/bbl, preferably 100 to 500 lbs/bbl, most preferably 150 to 350 lbs/bbl of total ground blast furnace slag in the cementitious slurry, i.e., pounds based on one barrel of the final cementitious slurry. Thus, it can be seen that the amount of microfine-ground blast furnace slag required in the total operation is only a fraction of the total blast furnace slag used to cement. Thus, the operation is carried out most efficiently because a small amount of microfine ground blast furnace slag is used as described hereinabove for the drilling, then a larger amount of normally ground blast furnace slag is used to form the cementitious slurry.

While the drilling fluid could be disposed of in a normal manner and a cementitious slurry made up from new ingredients, it is preferred to simply add normally ground blast furnace slag and activators to the used drilling fluid produced during the course of the drilling, thus any microfine ground blast furnace slag not migrating into the pores of the formation is incorporated into the final cementitious slurry.

Suitable activators include sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium sulfate, calcium nitrate, calcium nitrite, sodium sulfate and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to 'lbs/bbl' means pounds per barrel of final cementitious slurry. The amounts referred to hereinabove are the amounts actually added to the cementitious slurry. If some activator was included in the drilling fluid, that amount can generally be disregarded when calculating the amount to use in the cementitious slurry unless the amount used was toward the upper range disclosed in which case some compensation could be made by way of reducing the accelerator in the final cementitious slurry from the amounts described hereinabove.

When drilling the initial section of the borehole, drilling fluid may not be returned to the drilling operation in which case, of course, the cementitious slurry would be made up with all new ingredients for cementing the first section of the casing.

After the surface casing is lowered into the well, it is cemented in place using a slurry made by adding additional hydraulic material to the drilling mud. Since the drilling mud already contains and is compatible with the hydraulic material used in the present invention, i.e., blast furnace slag, it is possible to add the material with additional activators directly to the drilling fluid to produce a cementitious slurry which will set much quicker and which will be much harder and stronger than would the drilling fluid without the additional materials. The resulting cementitious slurry then can be pumped down the pipe which suspends the casing in the wellbore drilled in the seafloor. It then flows into the annular space between the casing and the borehole walls displacing the drilling fluid that was in the borehole. Alternatively, it can be introduced directly into the annulus between the casing and the walls of the wellbore. Since the cementing slurry is compatible with the drilling fluid present in the annular space, there is no need to displace the drilling fluid from the annular space using a special spacer fluid as is required when Portland cements are used. Likewise, the slurry is compatible with the hardening mud filter cake which is formed by the drilling fluid on the incompetent formations penetrated by the borehole. Since both the mudcake and the cementing fluid contain the same hydraulic material, they are fully compatible. Thus, the mudcake remain in place and need not be removed when cementing the casing in place.

Normal filtration, or fluid loss, continues as the cementing slurry fills the annulus. The water soluble activators added to the cementitious slurry are carried to the previously formed drilling fluid filter cake and migrate or diffuse into the microfine ground slag-filled portions of the formation. These activators produce a quick setting reaction in the deposited drilling fluid solids and, because the solids have been concentrated by the filtration process, a very hard and strong set filter cake and surrounding formation are produced. At the same time the setting cementing slurry, being composed of the same materials as the filter cake, forms an intimate and very strong bond to the setting filter cake. This ensures that the water flow will not wash out the cement or destroy the bond between the cement and the borehole wall. This will further ensure that the casing, once cemented in place, can adequately support the wellhead equipment.

The filling of the formation pore spaces by the microfine ground blast furnace slag occurs during the drilling phase of the program and is completed by the time the cementitious slurry is circulated into place. There is then no physical benefit, but there is a strong economic disincentive, for the addition of the more expensive microfine ground blast furnace slag instead of regular fine ground blast furnace slag when converting that portion of the drilling fluid which will be used for the cementing operations.

FILTER CAKE SETTING

In yet another embodiment of this invention the drilling process is carried out as described hereinabove with a universal fluid to produce a borehole through a plurality of strata, thus laying down a filter cake. Prior to the cementing operation, an activator is passed into contact with the filter cake, for instance by circulating the activator down the drill string and up the annulus between the drill string and the filter cake, or else the drill string is removed and the casing inserted and the activator circulated down the casing and up the annulus. As used herein 'down' as it relates to a drill string or casing means in a direction toward the farthest reach of the borehole even though in rare instances the borehole can be disposed in a horizontal position. Similarly, 'up' means back toward the beginning of the borehole. Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which water, for instance) or other unstable zones. After the drilling is complete the drilling fluid is then diluted, if necessary, the drill string removed, and the cementing carried out as described hereinabove. The hardening of the drilling fluid filter cake prior to cementing can be accomplished by circulating a separate fluid containing the activator or by adding an activator such as an alkali as described hereinabove to the drilling fluid.

Conventional spacers may be used in the above described sequence. Also, any leftover fluid having activators therein may be displaced out of the borehole by the next fluid and/or a spacer fluid and stored for subsequent use or disposal.

In this embodiment where the filter cake is "set", the activator can be any of the alkaline activators referred to hereinabove such as a mixture of sodium hydroxide and sodium carbonate.

EXAMPLE

A fluid suitable for suspending and carrying the microfine slag particles into the formation for consolidation should, before the addition of the hydraulic slag materials, have the following characteristics: low density, low or zero solids content, high filtration rates, high salt toleration, and sufficient viscosity or gel structure to suspend the ground slag. Many water soluble polymers commonly used in formulating drilling fluids can be used to provide the suspension properties in either fresh water or salt water systems.

The formulations of two of such slag-containing drilling fluids are shown in the following Table 1. These tests were run to demonstrate that the drilling fluids containing the microfine ground blast furnace slag will harden in the borehole to give some strengthening to the incompetent formations even if bypassed by the succeeding cementing operations and not concentrated (and thus made much harder) by filtration. The two test temperatures show that the hardening occurs both at normal room temperature and at the low temperatures found at the seafloor of many offshore drilling operations.

TABLE 1

| Formulation | A | B |
| --- | --- | --- |
| Sea water, bbl | 1.0 | 1.0 |
| NaCl, lbs/bbl | 61.3 | 61.3 |
| "XC-POLYMER[1]", lbs/bbl (H$_2$O Soluble Polymer) | 1.5 | 1.5 |
| "FLRXL[2]", lbs/bbl (H$_2$O Soluble Polymer) | 1.5 | 1.5 |
| "CA-600[3]", lbs/bbl (Dispersant) | 0.8 | 0.8 |
| "MC-100[4]", lbs/bbl (Microfine Ground Blast Furnace Slag) | 41.6 | 41.6 |
| NaOH, lbs/bbl (Activator) (Rolled, 16 hrs @ RT) | 4.0 | — |
| Additional NaOH, ppb | 6.0 | 10.0 |

| Hardness Over Time | 50° F. | 72° F. | 50° F. | 72° F. |
| --- | --- | --- | --- | --- |
| 16 hours | — | — | — | 6 |
| 22 hours | — | 4.0 | — | 8.2 |
| 39 hours | 2.0 | 8.5 | 3.0 | 9.0 |
| 63 hours | 2.0 | 9.6 | 9.0 | 9.0 |
| 87 hours | 8.5 | 9.3 | 8.8 | 9.2 |

Note: A hardness measurement of 9 is equal to a compressive strength of 150 psi.
[1]Xanthan gum sold under the trade name "XC POLYMER" by Kelco Industries.
[2]Trade name of IDF for a fluid loss additive.
[3]Dispersant sold by Geochem.
[4]Trade name of Geochem. Small particle blast furnace slag is also available from Koch Industries, Tulsa Oklahoma.

Another set of tests, conducted to show the effects of changing both the particle size of the ground slag and the pore size in a formation, are summarized in Table 2.

Slurries containing different types of ground slag were forced down into 1⅛th-inch-thick packs of unconsolidated sand grains. If the slurry flowed completely through the sand pack, the flow was stopped and the slurry left undisturbed in the pack to harden. If the slurry would not flow completely through the sand pack, a filter cake would build in and on top of the sand pack with a clean filtrate being produced through the sand pack. After a definite visible filter cake was built on top of the sand pack, the pressure was released and the system left to harden.

After the hardening period, the still unconsolidated portion of the sand was washed away and the consolidation depth determined. The entire process was then repeated using different slag slurries and different sand packs.

The slurries were made by mixing 100 grams of a ground slag with 107 grams of a water solution which contained 3.4wt % sodium hydroxide and 3.4 wt % sodium carbonate as activators. The slurries were made using either microfine ground slag or regular fine ground slag. The sand packs were either a 20–40 mesh rounded grain silica sand or a 50–140 mesh rounded grain silica sand.

TABLE 2

| Sand Pack Material | Slag Type | SAND PACK CONSOLIDATION Depth of Consolidation | |
| --- | --- | --- | --- |
| | | Inches | % of Pack |
| 20–40 Mesh | Microfine[1] | 1¼ | 100 |
| 20–40 Mesh | Regular[2] | 1¼ | 100 |

TABLE 2-continued

| Sand Pack | | SAND PACK CONSOLIDATION Depth of Consolidation | |
|---|---|---|---|
| Material | Slag Type | Inches | % of Pack |
| 50–140 Mesh | Microfine[1] | 1 | 89 |
| 50–140 Mesh | Regular[2] | ⅛ | 11 |

[1] A blast furnace slag with a Blaine surface area of about 11,000 sold under the trade name "MICROFINE MC 100" by Geochem.
[2] A blast furnace slag with a Blaine surface area of about 5,500 and sold under the name "NEWCEM" by Blue Circle Cement Co.

It can be seen that the microfine ground slag penetrated the pack of fine sand (50–140 mesh) much deeper than did the regular ground slag.

From the above data it can be seen that the microfine ground slag will penetrate small pore formations much more deeply than will the regular ground slag. It will then harden in place to strengthen the formation and seal the pores.

While this invention has been described in detail for the purpose of illustration, it is not to be construed as limited thereby but is intended to cover all changes and modifications within the spirit and scope thereof.

What is claimed is:

1. A method for consolidating a formation penetrated by a borehole, comprising:
   drilling the borehole using an aqueous drilling fluid comprising microfine-ground blast furnace slag;
   applying sufficient hydraulic pressure to force said drilling fluid to flow into said formation and lay down a filter cake on the borehole walls; and
   contacting said filter cake with an activator which is added to said drilling fluid.

2. A method according to claim 1 wherein said activator is a mixture of sodium hydroxide and sodium carbonate.

3. A method according to claim 1 wherein water in said drilling fluid is seawater.

4. A method according to claim 1 wherein water in said drilling fluid is fresh water.

5. A method according to claim 1 wherein said microfine-ground blast furnace slag has a fineness such that it exhibits a surface area between 10,000 and 12,000 cm²/g.

6. A method according to claim 1 wherein said drilling fluid consists essentially of seawater and said blast furnace slag.

7. A method for consolidating a formation penetrated by a borehole, comprising:
   drilling the borehole using an aqueous drilling fluid comprising microfine-ground blast furnace slag and an activator; and
   applying sufficient hydraulic pressure to force said drilling fluid to flow into said formation and lay down a self-setting filter cake on the borehole walls.

8. A method according to claim 7 wherein said activator is a mixture of sodium hydroxide and sodium carbonate.

9. A method for drilling and cementing a well, comprising:
   drilling a borehole in a subterranean formation using an aqueous drilling fluid comprising microfine ground blast furnace slag under sufficient pressure to cause flow of said drilling fluid into said formation;
   thereafter inserting a casing into said borehole; and
   thereafter passing a cementitious slurry comprising water, normally ground blast furnace slag and an activator into the annulus between said casing and said borehole.

10. A method according to claim 9 wherein said cementitious slurry is prepared by combining said normally ground blast furnace slag with used drilling fluid from said drilling.

11. A method according to claim 10 wherein said blast furnace slag of said drilling fluid has a particle size such that it exhibits a surface area of 10,000 to 12,000 cm²/g and said normally ground blast furnace slag of said cementitious slurry has a particle size such that it exhibits a surface area of 5,000 to 6,000 cm²/g.

12. A method according to claim 10, wherein said drilling fluid comprises seawater.

13. A method according to claim 10 wherein said drilling fluid comprises fresh water.

14. A method according to claim 10 wherein said cementitious slurry is injected down said casing and up said annulus.

15. A method according to claim 10 wherein said drilling fluid contains an activator, said activator comprising 0.1 to 10 lbs/bbl of caustic soda and 0.1 to 15 lbs/bbl of soda ash, and said activator of said cementitious slurry comprises 2 to 6 lbs/bbl of caustic soda and 2 to 20 lbs/bbl of soda ash.

16. A method according to claim 10 wherein said microfine ground blast furnace slag has a particle size such that less than 1 wt % has a dimension greater than 16 microns and at least 1 wt % has a dimension less than 1 micron with greater than 50% by weight being between 2 and 6 microns, and wherein said normally ground slag of said cementitious slurry has a particle size such that greater than 50% by weight is made up of particles between 4 and 20 microns.

17. A method according to claim 16 wherein said normally ground blast furnace slag is present in said cementitious slurry in an amount sufficient to give a total weight of blast furnace slag in said cementitious slurry within the range of 100 to 500 lbs/bbl of cementitious slurry.

18. A method for drilling and cementing a well, comprising:
   drilling a borehole in a subterranean formation using an aqueous drilling fluid comprising microfine-ground blast furnace slag under sufficient pressure to cause flow of said drilling fluid into said formation;
   thereafter inserting a casing into said borehole; and
   thereafter passing a cementitious slurry comprising water and normally-ground blast furnace slag into the annulus between said casing and said borehole.

* * * * *